US011975413B2

(12) United States Patent
Boehmer et al.

(10) Patent No.: US 11,975,413 B2
(45) Date of Patent: May 7, 2024

(54) PRODUCTION STATION FOR WORKPIECES, IN PARTICULAR VEHICLE BODY PARTS, AND PRODUCTION SYSTEM

(71) Applicant: Dr. Ing. h.c. F. Porsche Aktiengesellschaft, Stuttgart (DE)

(72) Inventors: Johannes Christoph Boehmer, Stuttgart (DE); Alexander Eckert, Tiefenbronn (DE); Markus Kreutel, Hardheim (DE); Andreas Wachtel, Leonberg (DE)

(73) Assignee: Dr. Ing h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 18/008,597

(22) PCT Filed: May 6, 2021

(86) PCT No.: PCT/EP2021/025172
§ 371 (c)(1),
(2) Date: Dec. 6, 2022

(87) PCT Pub. No.: WO2021/254656
PCT Pub. Date: Dec. 23, 2021

(65) Prior Publication Data
US 2023/0249297 A1     Aug. 10, 2023

(30) Foreign Application Priority Data

Jun. 18, 2020 (DE) ...................... 10 2020 116 123.9

(51) Int. Cl.
*B23P 21/00* (2006.01)
*B62D 65/02* (2006.01)

(52) U.S. Cl.
CPC ........... *B23P 21/004* (2013.01); *B23P 21/006* (2013.01); *B62D 65/022* (2013.01);
(Continued)

(58) Field of Classification Search
CPC ... B23P 21/004; B23P 21/006; B23P 2700/50; Y10T 29/49622; Y10T 29/49828;
(Continued)

(56) References Cited

U.S. PATENT DOCUMENTS 10,744,605 B2 * 8/2020 Thorwarth ............ B23P 21/004
2002/0100159 A1 * 8/2002 Swartz .................. B23P 21/004
29/430
(Continued)

FOREIGN PATENT DOCUMENTS

CA        2424448 A1 * 10/2003 ........... B23K 37/047
CN        108526886 A * 9/2018 ............ B23P 21/006
(Continued)

*Primary Examiner* — Jermie E Cozart
(74) *Attorney, Agent, or Firm* — Gerald E. Hespos; Michael J Porco

(57) ABSTRACT

A production station for vehicle body parts is configured in a modular manner and has at least two production cells (8, 10; 12, 14), each of which has a separate work area (16, 18; 20, 22). The work areas have uniformly disposed robots (64, 66, 68, 70) and receiving arrangements (32, 34, 36, 38, 40, 42) that interact with the robots. At least one transport arrangement (56) for required components (58, 60, 62) and workpieces (44, 46) is provided for both production cells (8, 10; 12, 14). A receiving arrangement store (24, 26; 28, 30; 110) with all of the receiving arrangements is assigned to each production cell (8, 10; 12, 14), and a transport arrangement (48, 50; 52, 54; 111) is provided for at least one production cell. The production cells are coupled to one another via a connecting axle (102) having at least one connecting robot (104).

14 Claims, 2 Drawing Sheets

(52) U.S. Cl.
CPC ..... *B23P 2700/50* (2013.01); *Y10T 29/49622* (2015.01); *Y10T 29/49828* (2015.01); *Y10T 29/49829* (2015.01); *Y10T 29/53365* (2015.01); *Y10T 29/53539* (2015.01)

(58) Field of Classification Search
CPC ......... Y10T 29/49829; Y10T 29/53365; Y10T 29/53539; B62D 65/022
See application file for complete search history.

(56) References Cited

U.S. PATENT DOCUMENTS

| | | | | |
|---|---|---|---|---|
| 2004/0055131 | A1* | 3/2004 | Ghuman | B25J 17/0216 29/429 |
| 2008/0220955 | A1* | 9/2008 | Hesse | B23P 21/008 29/33 P |
| 2008/0253871 | A1* | 10/2008 | Bergeron | B23P 21/004 414/281 |
| 2011/0192007 | A1* | 8/2011 | Kilibarda | B62D 65/00 29/430 |
| 2014/0259613 | A1* | 9/2014 | Shiota | B23P 21/006 29/428 |
| 2017/0066592 | A1* | 3/2017 | Bastian, II | B25J 5/02 |

FOREIGN PATENT DOCUMENTS

| | | | | |
|---|---|---|---|---|
| DE | 202014101002 | | 6/2015 | |
| DE | 202014101003 | U1 * | 7/2015 | ........... B23P 21/004 |
| DE | 202017101643 | U1 * | 6/2018 | ............. B23P 21/00 |
| DE | 202017102155 | | 7/2018 | |
| DE | 202017102155 | U1 * | 8/2018 | ............. B23P 21/00 |
| DE | 102020116124 | B3 * | 11/2021 | |
| EP | 2119532 | A1 * | 11/2009 | ........... B23K 37/047 |
| FR | 2728186 | A1 * | 6/1996 | ........... B23P 21/006 |

* cited by examiner

PRODUCTION STATION FOR WORKPIECES, IN PARTICULAR VEHICLE BODY PARTS, AND PRODUCTION SYSTEM

BACKGROUND

Field of the Invention

The invention relates to a production station for workpieces, in particular vehicle body parts. The invention also relates to a production system.

Related Art

German utility model specification DE 20 2014 101 002 U1 describes a production station and a production system constructed from the stations that are intended to provide greater flexibility for the processes to be carried out in a production station and also to provide better and more flexible interlinking of production stations among one another. However, the disclosed type of flexibility only affects a scope of geometrical properties of the workpieces limited by respective maxima. In particular in the automotive industry, and particularly in the production of higher-quality vehicles, an ever-increasing individualization of the vehicles and the associated vehicle body parts is desired. In extreme cases, this can lead to the desire to produce a lot size of one piece in such a production system. To date, however, this has not yet been possible without adapting the respective production systems.

The object of the invention is therefore to provide a production station or a production system that avoids the aforementioned disadvantage in a simple and cost-efficient manner.

SUMMARY

One aspect of the invention relates to a production station in which a receiving arrangement store comprising all of the receiving arrangements is assigned to at least each of two production cells and a receiving arrangement transport arrangement is provided for at least one of the production cells. At least two of the production cells are coupled to one another via a connecting axle having at least one connecting robot. Receiving arrangements include receiving elements, such as workpiece tables, gripper elements, tools, etc., for example. This initially makes it possible to appropriately process any workpiece in any cell. Processing may include joining processes requiring so-called process means, such as welding, gluing, etc., press-on and press-in processes, such as screwing, nailing or press-fit connections, or also forming processes, such as folding, bending, clinching and riveting. It is also possible here for different joining processes to be carried out in one production station by coupling the production cells to one another via a connecting axle having at least one connecting robot.

In one embodiment, each production cell is assigned exactly one receiving arrangement store. Alternatively, at least two production cells can be assigned to a common receiving arrangement store.

In some embodiments, the transport arrangement and/or the receiving arrangement transport arrangement are configured as an automated guided vehicle (AGV) transport system. Floor-bound conveying means comprising their own travel drive are controlled automatically here and guided without contact. Alternatively, it is also possible to configure the transport arrangement as a floor conveyor technology (e.g. skid roller conveyor). These conveying means guide workpieces and/or required components to a corresponding position in the respective production cell at which they can be accessed by a robot.

In some embodiments, each production cell comprises four robots, all of which are suitable for carrying out joining processes and handling processes and of which at least one robot is in operative connection with the transport arrangement. Two of the robots may be in operative connection with the transport arrangement and may be spatially separated from the remaining two robots by the receiving arrangement transport arrangement. Such an arrangement provides a particularly compact, flexibly usable production station.

To carry out any joining process in any production cell, it is advantageous if process or operating equipment connection arrangements are provided at the same position in each production cell.

Similarly, tool change locations fitted with tools may be provided at the same position in each production cell. Stationary tools can be positioned as well.

A particularly compact production station is provided by disposing at least one parts store for providing components and/or workpieces on a side of the transport arrangement opposite to the production cells.

To ensure an exact processing of the workpieces, at least one robot may comprise control means for a geometric measurement of the receiving arrangements and the devices. This can prevent deviations caused by tilting.

In addition to gripping means, the connecting robot of some embodiments comprises means of material-locking joining processes.

The invention also relates to a production system comprising at least two such production stations, and an intermediate space used for possible temporary storage or for the loading and unloading of workpieces is provided between each two adjacent production stations. This makes it particularly easy to remove or reintroduce workpieces from the ongoing production process and/or not process them further until in a later production cycle.

At least one transport device may be provided in the intermediate space for communication, which can also mean connection or buffering, with the adjacent production cells. This makes it possible to transfer workpieces from one production station to the adjacent production station, for example, without using the transport arrangement.

The invention will be explained in more detail with reference to a drawing

DETAILED DESCRIPTION

Figure 1:
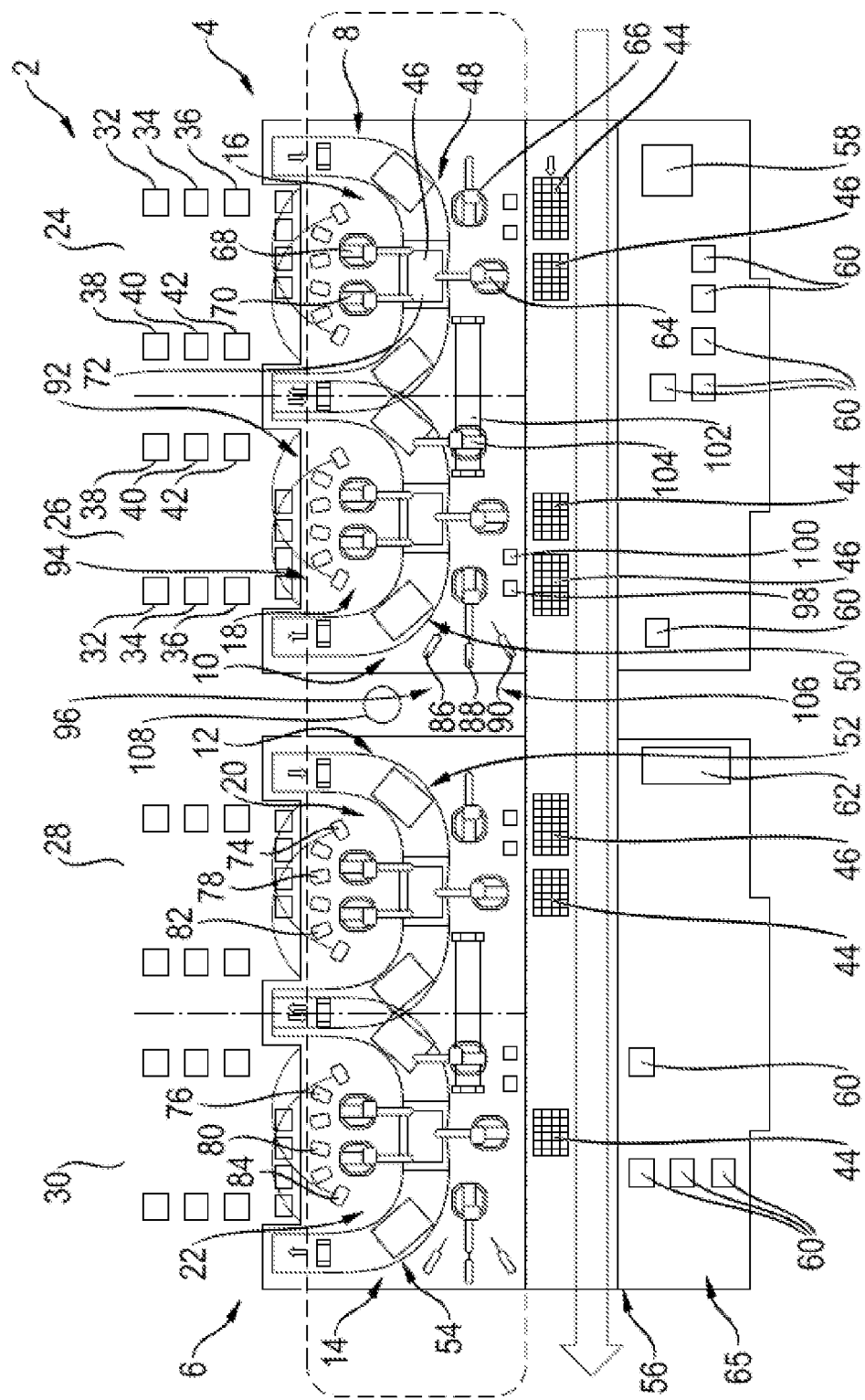
FIG. 1 shows a schematic view of two production stations which together form a production system.

The schematic drawing of FIG. 1 shows a production system 2 according to the invention which for the sake of clarity in the present design example is composed of two production stations 4, 6. Both production stations 4, 6 are configured in a modular manner. The production station 4 comprises two production cells 8, 10, and the production station 6 comprises two production cells 12, 14. The production cells 8, 10 of the production station 4 each have their own work area 16, 18 respectively that are constructed as a mirror images of one another, and the production cells 12, 14 of the production station 6 similarly have work areas 20, 22 respectively that are mirror images of one another. Each production cell 8, 10, 12, 14 is assigned its own receiving arrangement store 24, 26, 28, 30. Different receiving arrangements 32, 34, 36, 38, 40, 42 are provided in each of these receiving arrangement stores 24, 26, 28, 30 to receive different workpieces for different processing operations. The receiving arrangement stores 24, 26, 28, 30 are connected to the respective work area 16, 18, 20, 22 of the production cell 8, 10, 12, 14 via a receiving transport arrangement 48, 50, 52, 54. The respective receiving transport arrangement 48, 50, 52, 54 is configured here as an AGV transport system. A transport arrangement 56 for the workpieces 44, 46 and for components 58, 60, 62 required for the processing of the workpieces 44, 46 is provided on a side of the production stations 4, 6 opposite to the receiving arrangement stores 24, 26, 28, 30. This transport arrangement 56 is configured as an AGV transport system or as floor conveyor technology (e.g. skid roller conveyor). The AGV transport system 56 is used to provide the workpieces 44, 46 or the components 58, 60, 62 to the respective production stations 4, 6, and thus to the respective production cells 8, 10, 12, 14, at the required positions. A parts store 65 for providing the components 58, 60, 62 is disposed on the side of the transport arrangement 56 opposite to the production stations 4, 6 and thus also to the production cells 8, 10, 12, 14.

The processing of workpieces 44, 46 will be explained in more detail with reference to the production station 4 and its production cells 8, 10 together with the associated work areas 16, 18. The reference signs used here also apply to the production station 6 with the production cells 12, 14 which have the same configuration. Four robots 64, 66, 68, 70 are provided in the work area 16 of the production cell 8 which, in the present design example, are all basically suitable only for carrying out joining processes and handling operations. In the shown embodiment, two of the robots 64, 66 are in operative connection with the transport arrangement 56 and are spatially separated from the remaining two robots 68, 70 by the receiving transport arrangement 48. A receiving arrangement 36 brought close by the receiving transport arrangement 48 is fixed in place and is positioned here on a type of podium 72 (with or without an excavation for a receiving arrangement 36) and is thus ready, for example to receive the workpiece 46. The reference signs 76, 78, 80, 82, 84, 86, 88, 90 refer to tools that can be used by the respective robots 66, 68, 70 to process a workpiece 46, 48. The tools, too, are provided at a same position in each production cell 8, 10, 12, 14. Thus, the production cells 8, 10 and 12, 14 in the respective production station 4, 6 are constructed as mirror images of one another. The tools 74, 76, 78 are provided at a tool change location 92, the tools 80, 82, 84 are provided at a tool change location 94 and the tools 86, 88, 90 are provided at a tool change location 96. Process connection arrangements 98, for example for adhesives, etc., and operating equipment connection arrangements 100, for example for power and water, are configured in each production cell as well. To also be able to transfer workpieces from one production cell 8 to the adjacent production cell 10 in a production station 4, a connecting axle 102 having at least one connecting robot 104 is provided. This connecting robot 104 can also carry out joining operations on a workpiece to be processed.

To optimally align receiving arrangements 36, 38, 40, 42 and workpieces 46, 48 for processing, the robots 68, 70 comprise control means, which are not shown further here, for geometric measurement of the receiving arrangements 36, 38, 40, 42 and the workpieces 46, 48. An intermediate space 106 for temporary storage of processed or not yet processed workpieces 44, 46 is provided between the production stations 4, 6. This intermediate space 106 thus serves as a so-called buffer zone for temporary storage of workpieces 44, 46 that do not have to go through the entire production process. A further transport device 108, which is configured here as a rotary table, can be provided in this intermediate space 106 to enable communication between the adjacent production cells 10, 12. The intermediate space 106 can also be used for loading and unloading and can provide ample space for floor conveyors.

Figure 2:
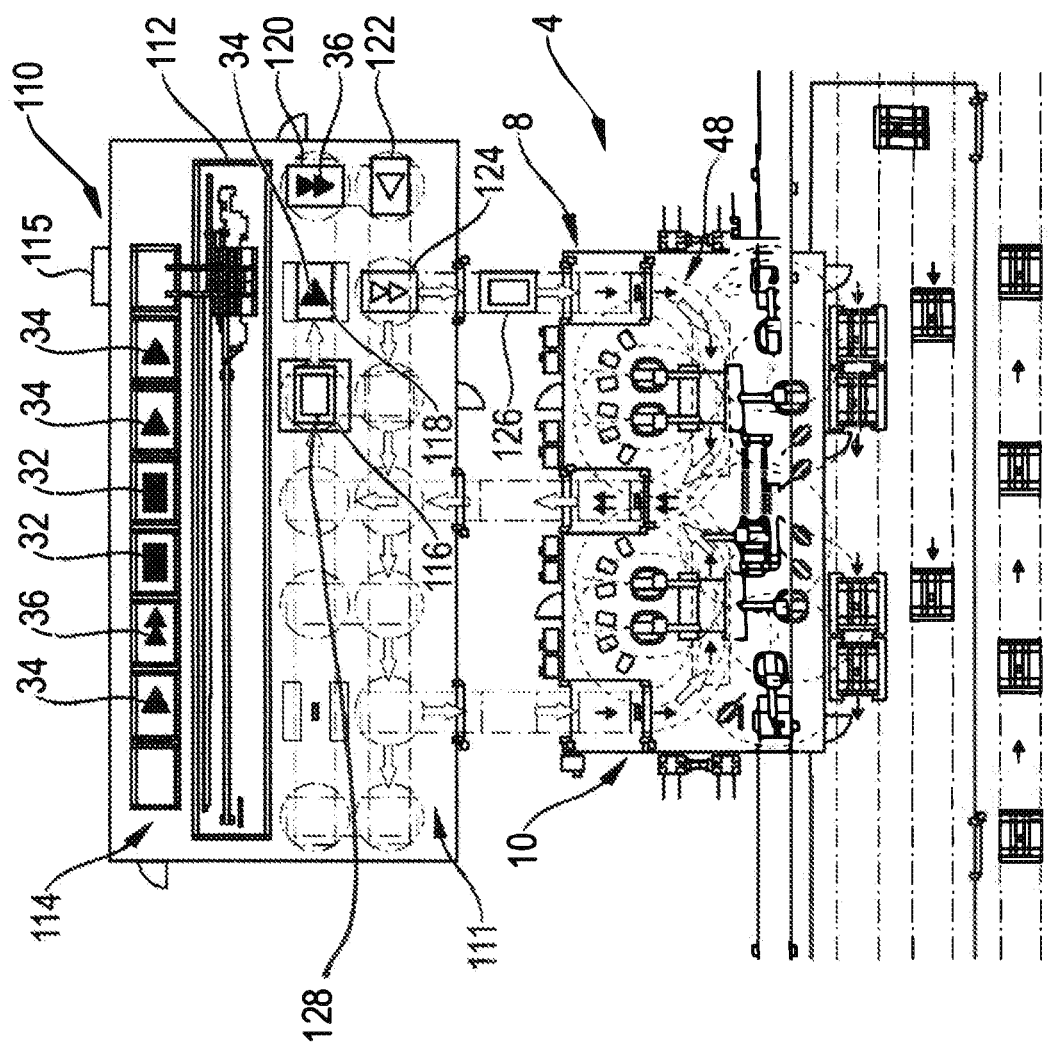
FIG. 2 shows a schematic view of a production station of FIG. 1 with an alternative embodiment of the receiving arrangement store.

FIG. 2 shows the production station 4 with two production cells 8, 10 that are constructed in exactly the same way as the production cells 8, 10 in FIG. 1, with an alternative embodiment of a receiving arrangement store 110, which in this design example is assigned to the two production cells 8, 10 and can supply each production cell 8, 10 with each available receiving arrangement 32, 34, 36, 38, 40, 42. An AGV transport system 111 as the receiving transport arrangement also is connected here to a storage control system 112 and, in this case, assigned to both production cells 8, 10. The storage control system 112 accesses a shelf arrangement 114 in which, in the present design example, receiving arrangements 32, 34, 36 are provided. The storage control system 112 here is designed such that the receiving arrangements 32, 34, 36 are moved from the shelf arrangement 114 to the production cells 8, 10 in a correct position and are moved back out of these production cells 8, 10 to the shelf arrangement 114. In addition, further receiving arrangements can be moved to or removed from the shelf arrangement via a transfer port 115. Six transport devices 116, 118, 120, 122, 124, 126 of the AGV transport system 111 are shown in the present design example to provide a more detailed description. A receiving table 128 (symbol "rectangle") has just been unloaded here from the transport device 116. The transport device 118 currently is loaded with a gripper element 34 (symbol "triangle") and the transport device 120 is currently loaded with two gripper elements 36 (symbol "double triangle"). The transport devices 124, 126 are empty and will be loaded in the first production cell 8 with two gripper elements 36 and a receiving table 32; meanwhile the transport device 122 is moved to the second production cell 10 and will be loaded there with a gripper element 32.

It should be clear that this creates a production system 2 that is not only flexible and compact in design, but which also makes it possible to produce workpieces of the most varied lot sizes and the most varied processing with reduced set-up times. It is thus possible, for example, to carry out material-locking joining processes, such as gluing or welding, in one production cell in a production station and at the same time carry out forming processes, such as folding or clinching, in the other production cell.

The invention claimed is:

1. A production station for workpieces, the production station (4, 6) being configured in a modular manner and comprises at least two production cells (8, 10; 12, 14), each of the production cells having a separate work area (16, 18; 20, 22), the work areas (16, 18; 20, 22) comprise a plurality of respectively uniformly disposed robots (64, 66, 68, 70) and receiving arrangements (32, 34, 36, 38, 40, 42) that interact with the robots, wherein at least one transport arrangement (56) for required components (58, 60, 62) and workpieces (44, 46) is provided for at least both production cells (8, 10; 12, 14), wherein a receiving arrangement store (24, 26; 28, 30; 110) comprising all of the receiving arrangements (32, 34, 36, 38, 40, 42) is assigned to at least each of the production cells (8, 10; 12, 14) and a receiving transport arrangement (48, 50; 52, 54; 111) is provided for at least one production cell (8, 10; 12, 14), wherein the at least two production cells (8, 10; 12, 14) are coupled to one another via a connecting axle (102) having at least one connecting robot (104).

2. The production station of claim 1, wherein each of the production cells (8, 10; 12, 14) is assigned exactly one of the receiving arrangement stores (24, 26; 28, 30).

3. The production station of claim 1, wherein at least two of the production cells (8, 10; 12, 14) are assigned a common receiving arrangement store (110).

4. The production station claim 1, wherein the transport arrangement (56) is configured as an AGV (automated guided vehicle) transport system or floor conveyor technology.

5. The production station of claim 1, wherein the receiving transport arrangement (48, 50, 52, 54; 111) is configured as an AGV (automated guided vehicle) transport system.

6. The production station of claim 1, wherein each of the production cells comprises four robots (64, 66, 68, 70), all of which are suitable for carrying out joining processes and handling processes and at least one of the robots (64, 66) of each of the production cells is in operative connection with the transport arrangement (56).

7. The production station of claim 6, wherein two of the robots (64, 66) are in operative connection with the transport arrangement (56) and are disposed spatially separated from the remaining robots (68, 70) by the receiving transport arrangement (48, 50, 52, 54).

8. The production station of claim 1, wherein process or operating equipment connection arrangements (98, 100) are provided in identical positions in each of the production cells (4, 6, 8, 10).

9. The production station of claim 1, wherein tool change locations (92, 94, 96) fitted with tools (74, 76, 78, 80, 82, 84, 86, 88, 90) are provided at identical positions in each of the production cells.

10. The production station of claim 1, wherein at least one parts store (65) for providing components (58, 60, 62) and/or workpieces (44, 46) is provided on a side of the transport arrangement (56) opposite to the production cells (8, 10, 12, 14).

11. The production station of claim 1, wherein at least one of the robots (68, 70) comprises control means for a geometric measurement of the receiving arrangements (32, 34, 36, 38, 40, 42) and the workpieces (46, 48).

12. The production station of claim 1, wherein the connecting robot (104) at least comprises means for carrying out material-locking joining processes.

13. A production system comprising at least two of the production stations of claim 1, further comprising an intermediate space (106) provided between each of two adjacent production stations (4, 6) and used for possible temporary storage or for the loading and unloading of workpieces.

14. The production system of claim 13, wherein at least one transport device (108) is provided in the intermediate space for communication with adjacent production cells (10, 12).

* * * * *